United States Patent
Yasuda

(10) Patent No.: US 6,333,761 B2
(45) Date of Patent: Dec. 25, 2001

(54) IMAGE PICKUP APPARATUS HAVING FOCUS DETECTION AREA SIZE DEPENDENT ON ASPECT RATIO

(75) Inventor: Hitoshi Yasuda, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,476

(22) Filed: Mar. 31, 1997

(30) Foreign Application Priority Data

Apr. 9, 1996 (JP) .................................................... 8-086799
Apr. 9, 1996 (JP) .................................................... 8-086801
Jun. 20, 1996 (JP) .................................................... 8-159812

(51) Int. Cl.[7] .................................................. H04N 5/225
(52) U.S. Cl. ...................................... 348/333.12; 348/346
(58) Field of Search .................................... 348/239, 345, 348/346, 349, 350, 352, 353, 354, 358, 445, 454, 333.01, 333.02, 333.11, 333.12; 396/281, 296, 374, 378, 379; H04N 5/225

(56) References Cited

U.S. PATENT DOCUMENTS

| | | | | |
|---|---|---|---|---|
| 5,243,421 | * | 9/1993 | Nagata et al. | 348/445 |
| 5,298,994 | * | 3/1994 | Watanabe et al. | 348/445 |
| 5,629,735 | * | 5/1997 | Kaneda et al. | 348/350 |
| 5,739,857 | * | 4/1998 | Kaneda | 348/349 |

* cited by examiner

Primary Examiner—Tuan Ho
(74) Attorney, Agent, or Firm—Robin, Blecker & Daley

(57) ABSTRACT

An image pickup apparatus is arranged to vary the size of a focus detecting area and/or a light measuring area when the aspect ratio of an image plane is changed, so as to optimize the focus detecting area and/or the light measuring area with respect to the image plane.

16 Claims, 14 Drawing Sheets

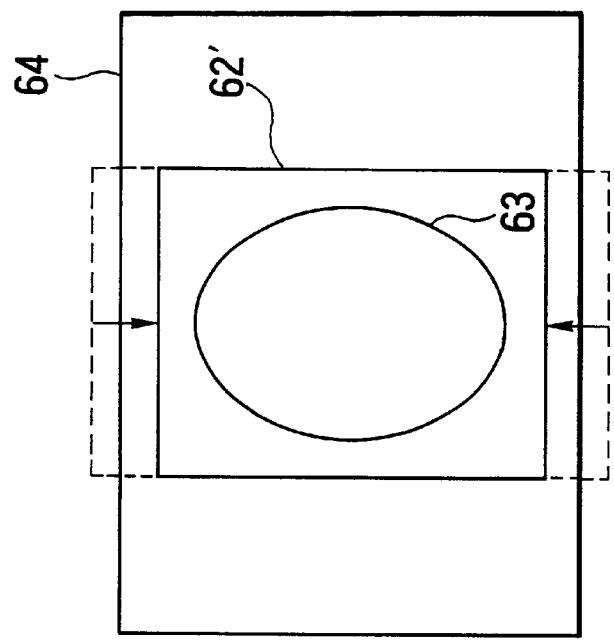
FIG. 6(b) WIDE MODE
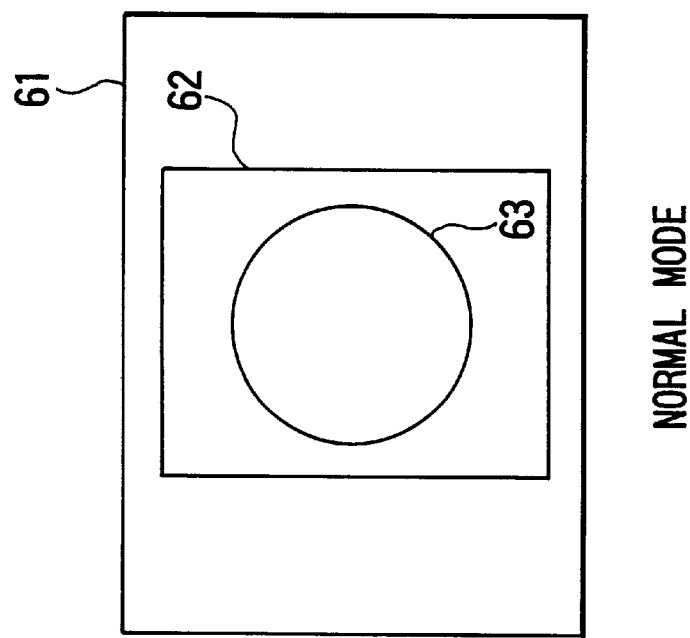
FIG. 6(a) NORMAL MODE

IMAGE PICKUP APPARATUS HAVING FOCUS DETECTION AREA SIZE DEPENDENT ON ASPECT RATIO

BACKGROUND OF THE INVENTION

1. Field of the Invention

This invention relates to an image pickup apparatus arranged to be capable of varying the size of an image plane.

2. Description of Related Art

It has been known that image pickup apparatuses such as video cameras are arranged to include automatic focus adjusting devices called AF devices for short. The AF device is arranged to detect the sharpness of an image plane from a video signal representative of an object image and to automatically perform a focusing action by controlling the position of a focusing lens in such a way as to maximize the sharpness of the image plane.

In general, the above sharpness is evaluated by using, as a sharpness signal, a signal which indicates the intensity of a high frequency component of a video signal extracted through a band-pass filter or a signal which indicates a detected intensity of a blurring width of a video signal extracted through a differentiating circuit or the like. Generally, in shooting an ordinary object, the sharpness signal is small when a focusing lens is out of focus. The sharpness signal becomes larger accordingly as the focusing state of the focusing lens comes closer to an in-focus state and reaches a maximum value when a perfect in-focus state is obtained. In controlling the focusing lens, the focusing lens is moved as fast as possible when the sharpness signal is small. The focusing lens is moved slower accordingly as the sharpness signal increases, so that the focusing lens can be brought to a stop precisely at a peak of a hill-like control curve, where the sharpness signal reaches a maximum value, thereby attaining an in-focus state. This automatic focusing method is generally called a hill-climbing automatic focusing method (hereinafter referred to as a hill-climbing AF). The hill-climbing AF permits simplification and reduction in size of cameras and is thus advantageous for compact and light-weight cameras. On account of this advantage, the hill-climbing AF is now most popularly employed for recent video cameras.

Meanwhile, a TV set having an image plane of the aspect ratio of 16:9 (hereinafter referred to as the wide TV) has recently been becoming popular to replace the conventional TV set having an image plane of the aspect ratio of 4:3. The wide TV is provided with a mode of providing the 16:9 image plane by magnifying the conventional 4:3 image plane to 1.33 times horizontally (in the width direction). To cope with this magnifying mode, some of known video cameras are arranged to record a picked-up image in a state of being vertically (in the height direction) magnified to 1.33 times beforehand at the time of shooting.

However, since the video camera of such a kind is arranged to perform the AF control and the change-over of the aspect ratio independently of each other, there arises the following problem, which will be explained with reference to FIG. 1.

In FIG. 1, reference numeral 1 denotes a picked-up image plane obtained on an image pickup element such as a CCD, reference numeral 2 denotes an AF distance measuring frame, reference numeral 3 denotes an object which is in an in-focus state, reference numeral 4 denotes an object which is in an out-of-focus state, and reference numeral 5 denotes a recording image plane obtained by changing the aspect ratio of the picked-up image plane 1. As shown in FIG. 1, when the aspect ratio is changed by magnifying the picked-up image plane 1 vertically, parts of upper and lower sides of the picked-up image plane 1 are expanded out of the recording image plane 5 and, therefore, disappears therefrom, and the AF distance measuring frame 2 also becomes relatively larger in the vertical direction. However, since the AF distance measuring frame 2 is left as it is, the focusing lens then tends to remain in focus on the object 3, which is located in the part disappearing from the image plane, so that the object 4 located inside the image plane would not be brought into focus, thereby remaining blurring.

Further, in performing the automatic exposure (abbreviated to AE) control as well as in performing the AF control, the same problem exists for the same reason, so that an adequate exposure for an object such as the object 4 would fail to be made.

BRIEF SUMMARY OF THE INVENTION

This invention is directed to the solution of the above-stated problem. It is, therefore, a first object of this invention to provide an image pickup apparatus capable of varying an aspect ratio of an image plane, in which a means for adjusting an image pickup state such as an AF control or an AE control is optimized.

It is a second object of this invention to provide an image pickup apparatus arranged to be capable of carrying out an AF control and an AE control without blurring images even when an image plane is magnified by varying the aspect ratio of the image plane.

To attain the above objects, an image pickup apparatus is arranged, as a preferred embodiment of this invention, to vary a focus detecting area when the aspect ratio of an image plane is varied.

An image pickup apparatus is arranged, as another preferred embodiment of this invention, to optimize a light measuring area by varying the light measuring area when the aspect ratio of an image plane is varied.

It is a third object of this invention to provide an image pickup apparatus arranged to optimize an automatic focus control operation when the exposure time of image pickup means is varied.

To attain the third object, an image pickup apparatus is arranged, as a further preferred embodiment of this invention, to restart focus adjustment means when the exposure time of image pickup means is varied during process of focus adjustment.

These and other objects and features of this invention will become apparent from the following detailed description of embodiments thereof taken in conjunction with the accompanying drawings.

BRIEF DESCRIPTION OF THE SEVERAL VIEWS OF THE DRAWING

FIGS. 6(a) and 6(b) show an image plane change-over action of the first embodiment of this invention.

DETAILED DESCRIPTION OF THE INVENTION

The following describes in detail the image pickup apparatus of this invention through preferred embodiments thereof with reference to the drawings.

Figure 1:
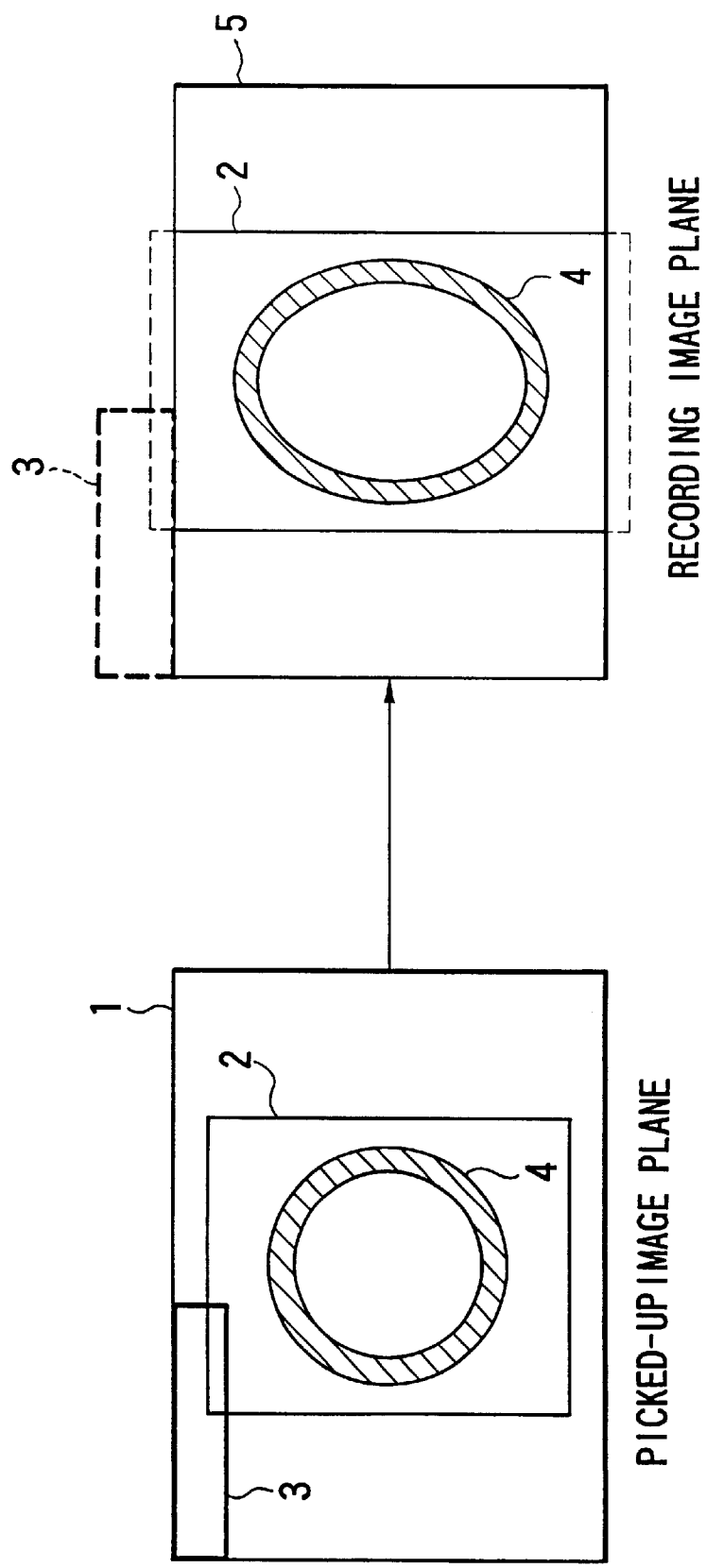
FIG. 1 is a diagram for explaining a problem arising when the aspect ratio of an image plane is varied.
Figure 2:
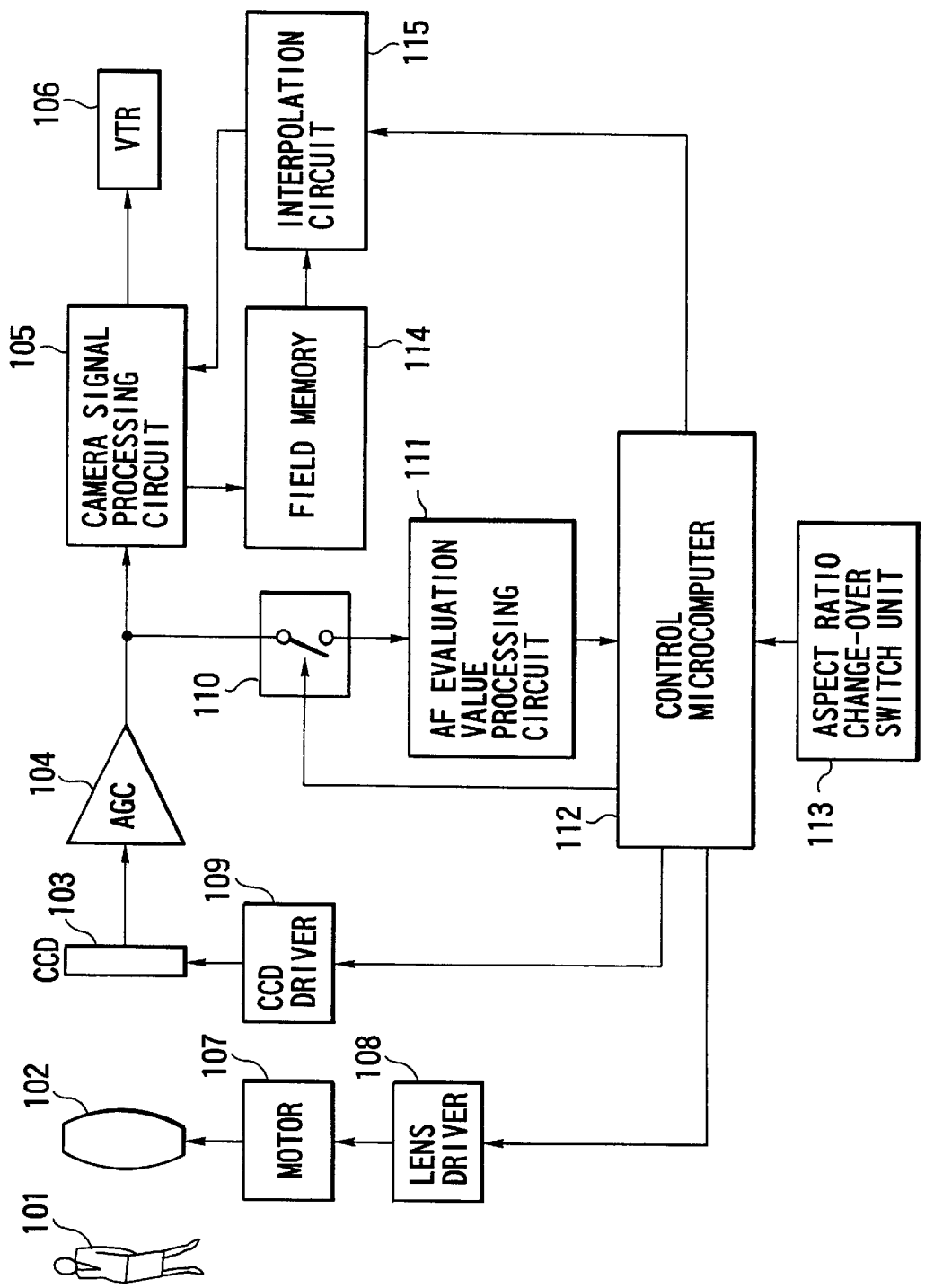
FIG. 2 is a block diagram showing the arrangement of an image pickup apparatus according to this invention as a first embodiment thereof.

FIG. 2 is a block diagram showing the arrangement of a video camera as a first embodiment of this invention.

Referring to FIG. 2, the illustration includes a shooting object 101 and a focusing lens 102. An image sensor 103 which is a CCD and hereinafter will be referred to as the CCD is arranged to photoelectrically convert an incident light into an electrical signal. An automatic gain control circuit 104 (hereinafter referred to as an AGC circuit) is arranged to electrically amplify the signal coming from the CCD 103. A camera signal processing circuit 105 is arranged to process the output of the AGC circuit 104, including various processes, such as a gamma correction process, a color separation process and a color-difference matrix process, and, after that, to make the processed signal into a video signal in the form of a standard TV signal by adding a synchronizing signal to the video signal. A video tape recorder (hereinafter referred to as a VTR) 106 is arranged to record the video signal on a tape. A motor 107 is arranged to drive the focusing lens 102. A lens driver 108 is arranged to supply driving energy to the motor 107 in accordance with a driving instruction given from a control microcomputer 112. A CCD driver 109 is arranged to control the CCD 103 in such a way as to cause the photoelectric conversion signal to be read out from the CCD 103. A gate circuit 110 is arranged to sample only a predetermined part of the signal outputted from the AGC circuit 104. An AF w evaluation value processing circuit 111, including a band-pass filter therein, is arranged to obtain a sharpness signal for evaluation of focus from the signal outputted from the gate circuit 110.

The control microcomputer 112 is arranged to perform focus adjustment by setting a predetermined gate area in the gate circuit 110 and causing the focusing lens 102 to be driven on the basis of a signal supplied from the AF evaluation value processing circuit 111. An aspect ratio change-over switch unit 113 is connected to the control microcomputer 112. A field memory 114 is arranged to take in and store a video signal for one picture processed by the camera signal processing circuit 105. An interpolation circuit 115 is arranged to read the signal out from the field memory 114 at a magnifying rate according to a control signal coming from the control microcomputer 112 and to form a signal to be used for interpolating the signal read out. A so-called electronic zooming action can be carried out jointly by the field memory 114 and the interpolation circuit 115.

Figure 4:
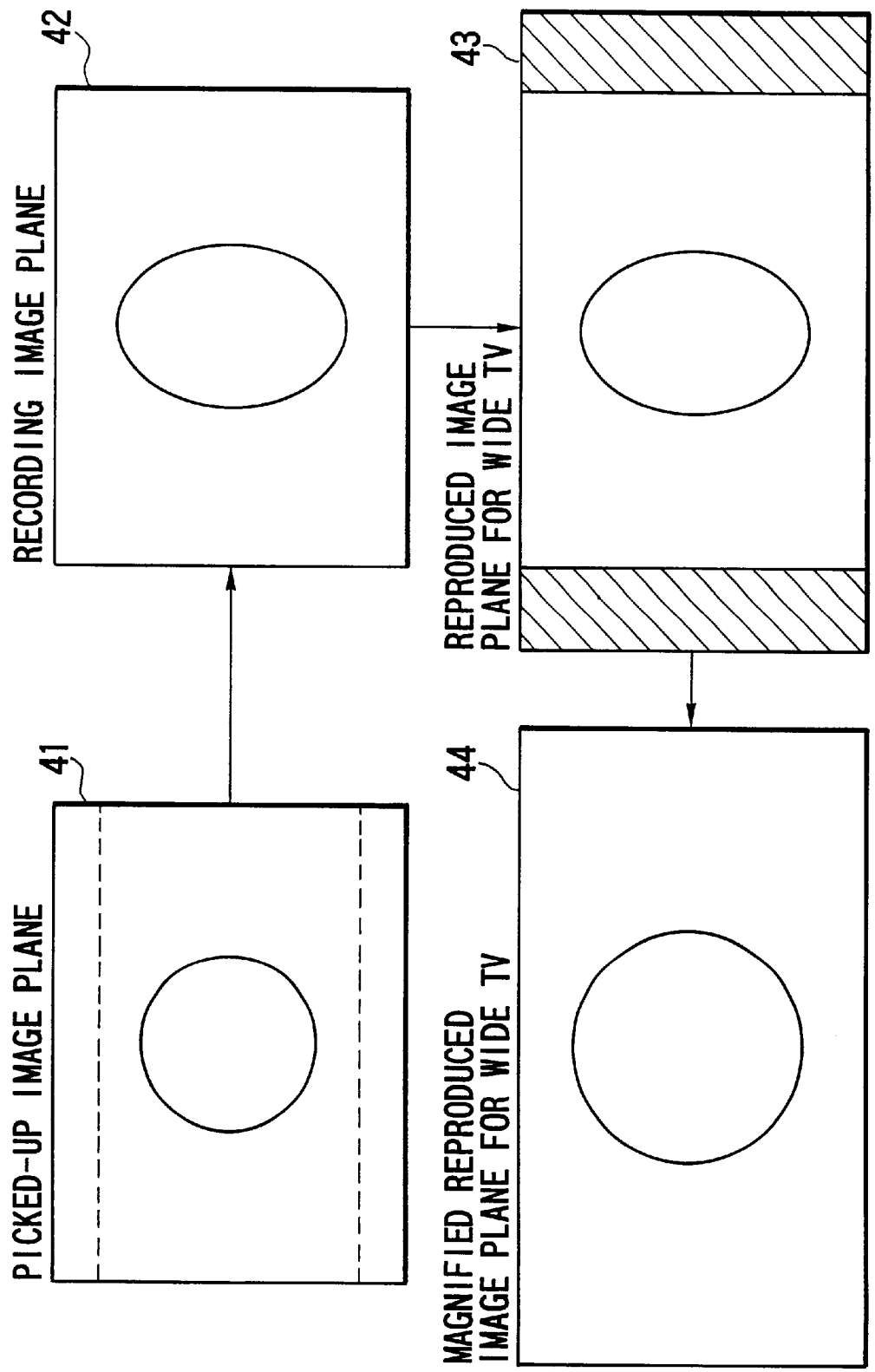
FIG. 4 is a diagram for explaining an image plane for a wide mode of the image pickup apparatus.

The image pickup apparatus which is arranged as described above functions to permit the aspect ratio of an image plane to be varied in response to a manual operation. FIG. 4 shows this function. Referring to FIG. 4, reference numeral 41 denotes a picked-up image plane on the CCD 103. In accordance with an input from the aspect ratio change-over switch unit 113, the control microcomputer 112 controls the interpolation circuit 115 in such a way as to obtain a recording image plane 42 by magnifying the picked-up image plane vertically to 1.33 times and to record the recording image plane 42. When the recording image plane 42 is reproduced by a wide TV set, there is obtained a reproduced image plane 43. Then, with the TV set switched to the magnifying mode as mentioned in the foregoing, dark parts disappear from the reproduced image plane 43 and a magnified reproduced image plane 44 is obtained showing an object image in a correct aspect ratio.

Figure 3:
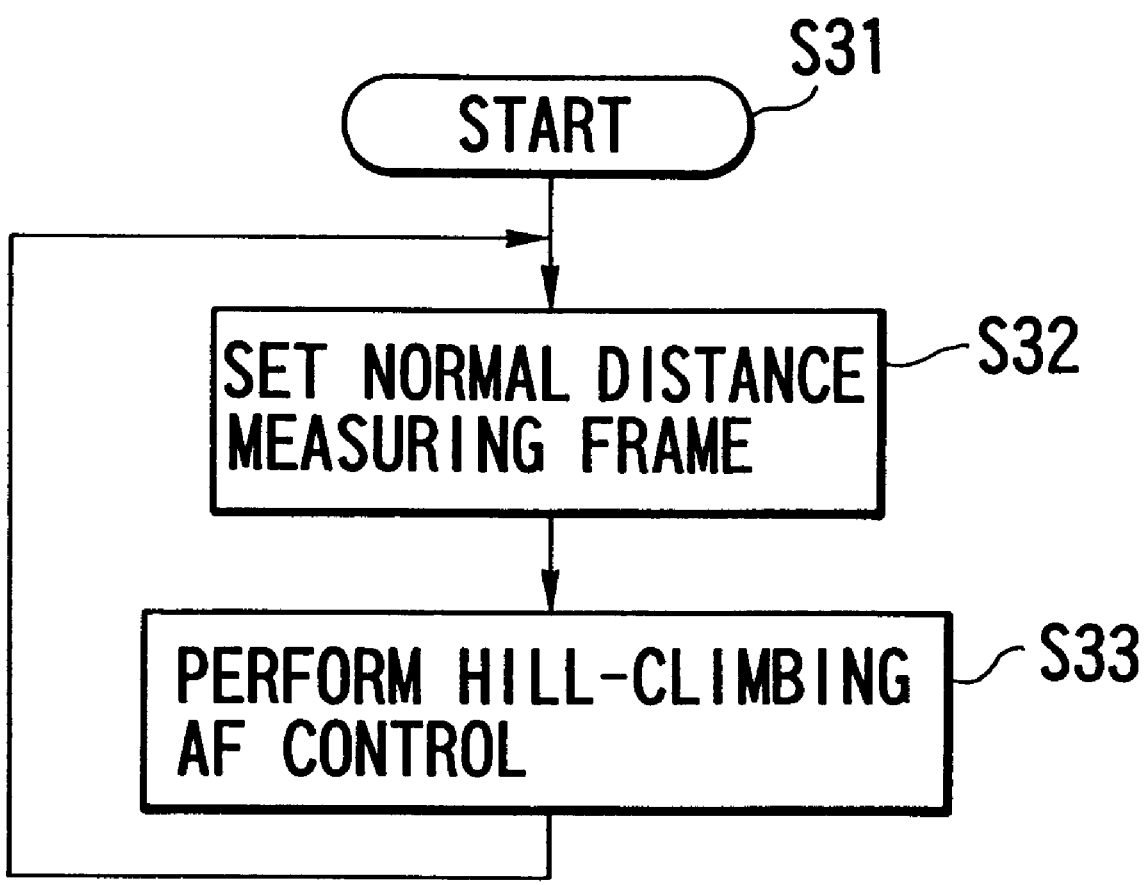
FIG. 3 is a flow chart showing a basic algorithm of an AF control.

FIG. 3 is a flow chart showing a flow of an AF control. The steps shown are executed within the control microcomputer 112. Referring to FIG. 3, the flow of operation begins at a step S31. At a step S32, the gate circuit 110 which is arranged to sample only a predetermined portion (a distance measuring frame) of the image plane is controlled to obtain a sharpness signal only from the predetermined portion of the image plane. At a step S33, the hill-climbing AF control whereby the focusing lens 102 is driven to maximize the sharpness signal obtained from the AF evaluation value processing circuit 111 is carried out in the manner as described in the foregoing. After that, the flow returns to the step S32. An in-focus state can be maintained by repeating these steps.

In the arrangement, the processes executed for the AF control up to the point described above are the same as the processes of the conventional image pickup apparatus described in the foregoing. Therefore, these processes would bring about the above-described problem at the time of change-over of the aspect ratio of the image plane.

Therefore, in accordance with this invention, the problem is solved by carrying out the following control.

Figure 5:
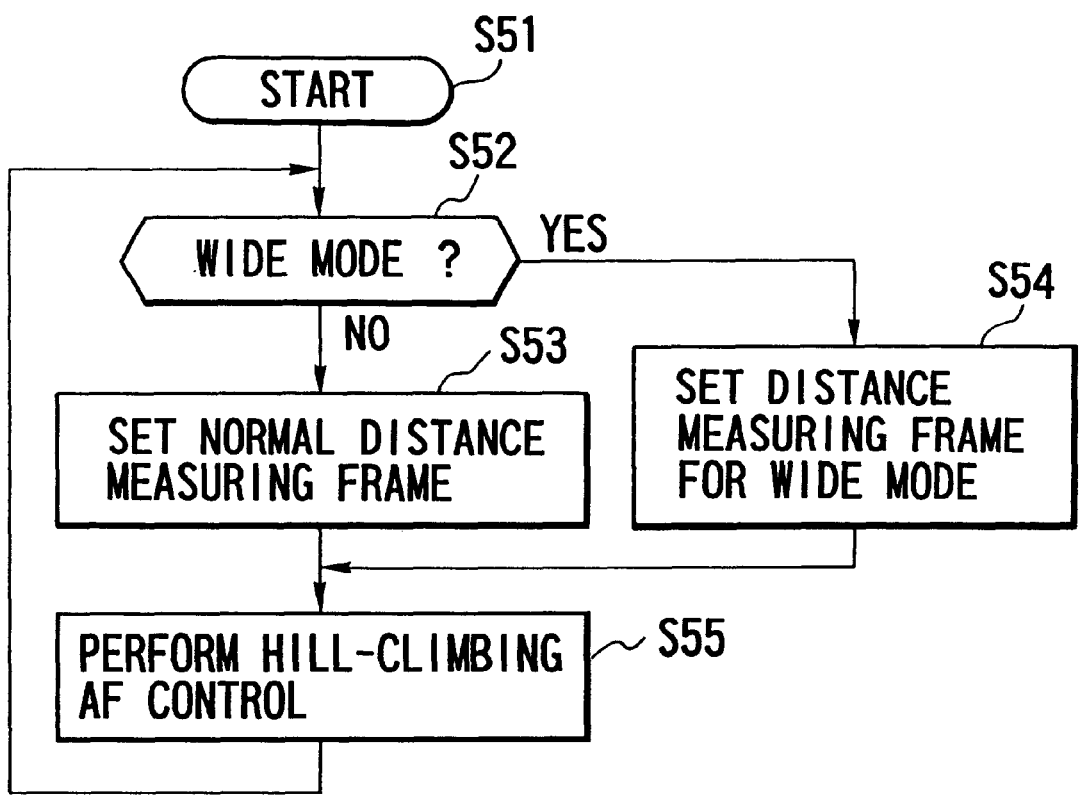
FIG. 5 is a flow chart showing an operation of the first embodiment of this invention.

FIG. 5 is a flow chart showing the flow of an AF control to be carried out within the control microcomputer 112 according to the first embodiment. Referring to FIG. 5, the flow begins at a step S51. At a step S52, a check is first made for the current aspect ratio of the image plane. If the aspect ratio is found to indicate the wide mode, the flow proceeds to a step S54. If not, the flow proceeds to a step S53.

At the step S53, a predetermined distance measuring frame for a normal image plane is set and the gate circuit 110 is controlled to form a sharpness signal only from a part defined by the distance measuring frame. At the step S54, on the other hand, a predetermined distance measuring frame for the wide mode for a vertically magnified image plane is set and the gate circuit 110 is controlled to form a sharpness signal from a part within the distance measuring frame for the wide mode. At a step S55, the hill-climbing AF control whereby the focusing lens 102 is driven to maximize the sharpness signal obtained from the AF evaluation value processing circuit 111 is carried out in the manner as described in the foregoing. After that, the flow returns to the step S52. An in-focus state can be maintained by repeating these steps.

The above-stated actions are further described with reference to FIGS. 6(a) and 6(b) as follows. These illustrations include a normal image plane 61, an AF distance measuring frame 62, a shooting object 63, and a wide image plane 64 obtained by varying the aspect ratio.

In this case, the above-stated step S54 is executed to change the AF distance measuring frame 62 to an AF distance measuring frame 62' for the wide image plane 64 in such a manner that the AF distance measuring frame 62' for the wide mode is kept in the same ratio as in the normal image plane and not expanded to the outside of the wide image plane 64 as indicated by broken lines.

With the AF control executed according to the algorithm shown in FIG. 5, the AF distance measuring frame is varied when the aspect ratio is varied in the manner as mentioned above. Unlike the conventional image pickup apparatus, the AF control can be carried out without blurring an image within the image plane by effectively preventing the lens from being focused on any object located in a part expanded outside of the image plane.

Figure 7:
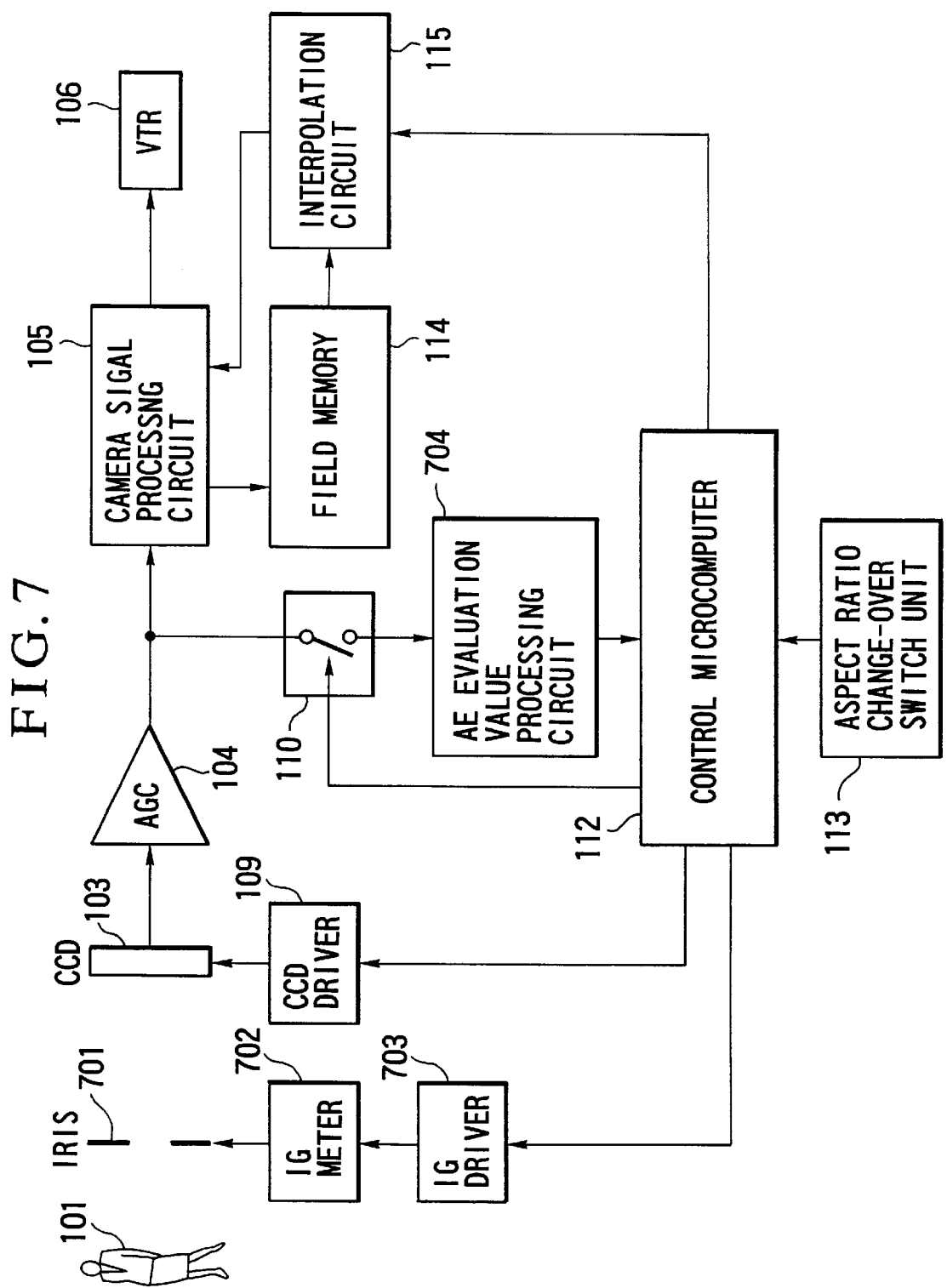
FIG. 7 is a block diagram showing the arrangement of an image pickup apparatus according to this invention as a second embodiment thereof.

FIG. 7 shows in a block diagram an image pickup apparatus which is arranged according to this invention as a second embodiment thereof. In the case of the second embodiment, the invention is applied to the automatic exposure adjustment of the image pickup apparatus. In FIG. 7, all parts that are similar to those shown in FIG. 2 are indicated by the same reference numerals and the details of such parts are omitted from the following description.

Referring to FIG. 7, an iris 701 is arranged to adjust the exposed state of the CCD 103. An IG meter 702 is arranged to operate the iris 701 for varying the width of an aperture of the iris 701. An IG driver 703 is arranged to supply driving energy to the IG meter 702. An AE evaluation value processing circuit 704 is arranged to form a light measurement signal for exposure evaluation from a signal outputted from the gate circuit 110. The light measurement signal is obtained by integrating the signal outputted from the gate circuit 110. The control microcomputer 112 controls the iris 701 in such a way as to keep the light measurement signal constant.

Figure 8:
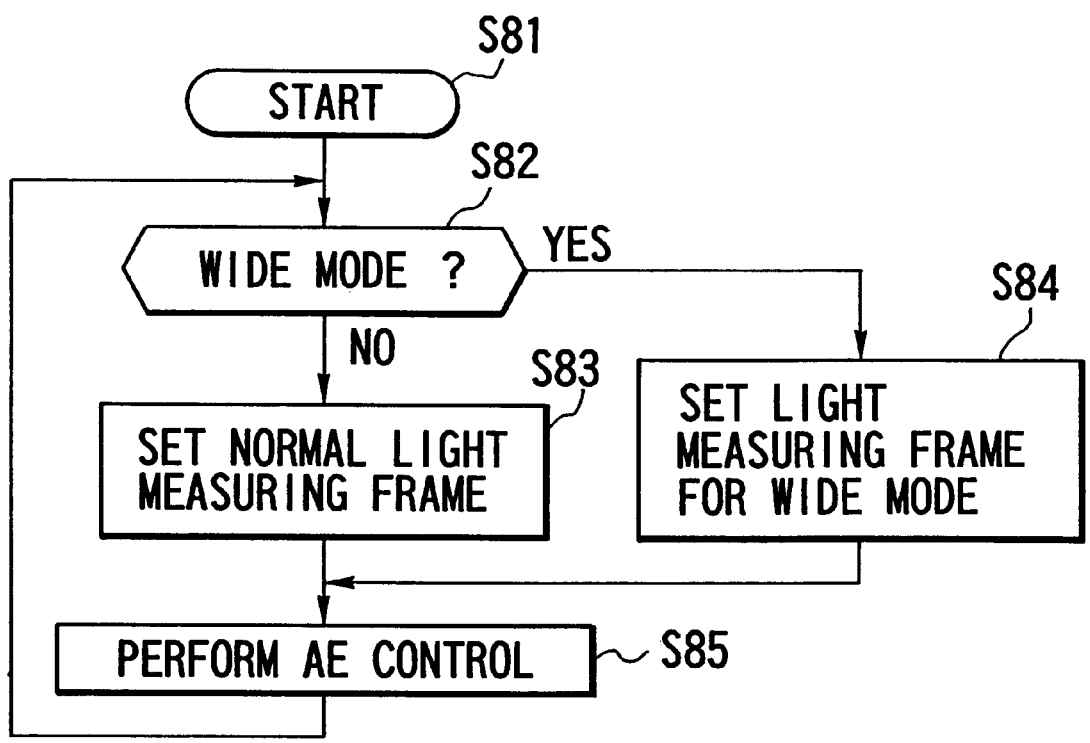
FIG. 8 is a flow chart showing an operation of the second embodiment of this invention.

FIG. 8 is a flow chart showing an AE control of the second embodiment of this invention. The flow of the AE control is executed within the control microcomputer 112. Referring to FIG. 8, the flow begins at a step S81. At a step S82, a check is made for the current aspect ratio of the image plane. If the aspect ratio is found to indicate the wide mode, the flow proceeds to a step S84. If not, the flow proceeds to a step S83. At the step S83, a predetermined light measuring frame for a normal image plane is set. Then, the gate circuit 110 is controlled to form a light measurement signal from a part within that light measuring frame for the normal image plane.

At the step S84, a predetermined light measuring frame for a vertically magnified image plane is set. The gate circuit 110 is controlled to form a light measurement signal only from a part within that light measuring frame for the vertically magnified image plane. At the next step S85, a so-called AE control is performed to drive the iris 701 in such a way as to keep the light measurement signal obtained from the AE evaluation value processing circuit 704 constant. The flow then returns to the step S82. By repeating these steps, an apposite state of exposure can be maintained.

With the AE control executed according to the algorithm shown in FIG. 8, the AE light measuring frame is varied when the aspect ratio is varied as mentioned above. The AE control can be carried out appositely for an object located within the image plane by effectively preventing a light measuring action on any object located in a part expanded outside of the image plane.

As described above, according to the first embodiment, the AF control is carried out in association with a change of the aspect ratio of the image plane in such a way as to vary the AF distance measuring frame when the aspect ratio of the image plane is varied. Therefore, unlike the conventional image pickup apparatus, the AF control can be carried out without blurring an image within the image plane, by effectively preventing the lens from being focused on any object located in a part expanded outside of the image plane.

Further, according to the second embodiment described above, the AE control is carried out in association with a change of the aspect ratio of the image plane in such a way as to vary the AE light measuring frame when the aspect ratio is varied. Therefore, unlike the conventional image pickup apparatus, the AE control can be carried out appositely to an object located within the image plane irrespective of the aspect ratio, by preventing an exposure from being made appositely to any object located in a part expanded outside of the image plane.

A third embodiment of this invention is next described. Generally, an AF device employed in a video camera is arranged to automatically carry out adjustment of focus by detecting the sharpness of an image from a picked-up image signal as mentioned in the foregoing. The third embodiment is arranged to solve the problem that, when the aspect ratio of an image plane is varied, a focusing lens of the video camera sometimes fails to be appositely focused on a shooting object located within a picked-up image plane. Such a problem and the solution thereof will be described in order as follows.

Figure 11:
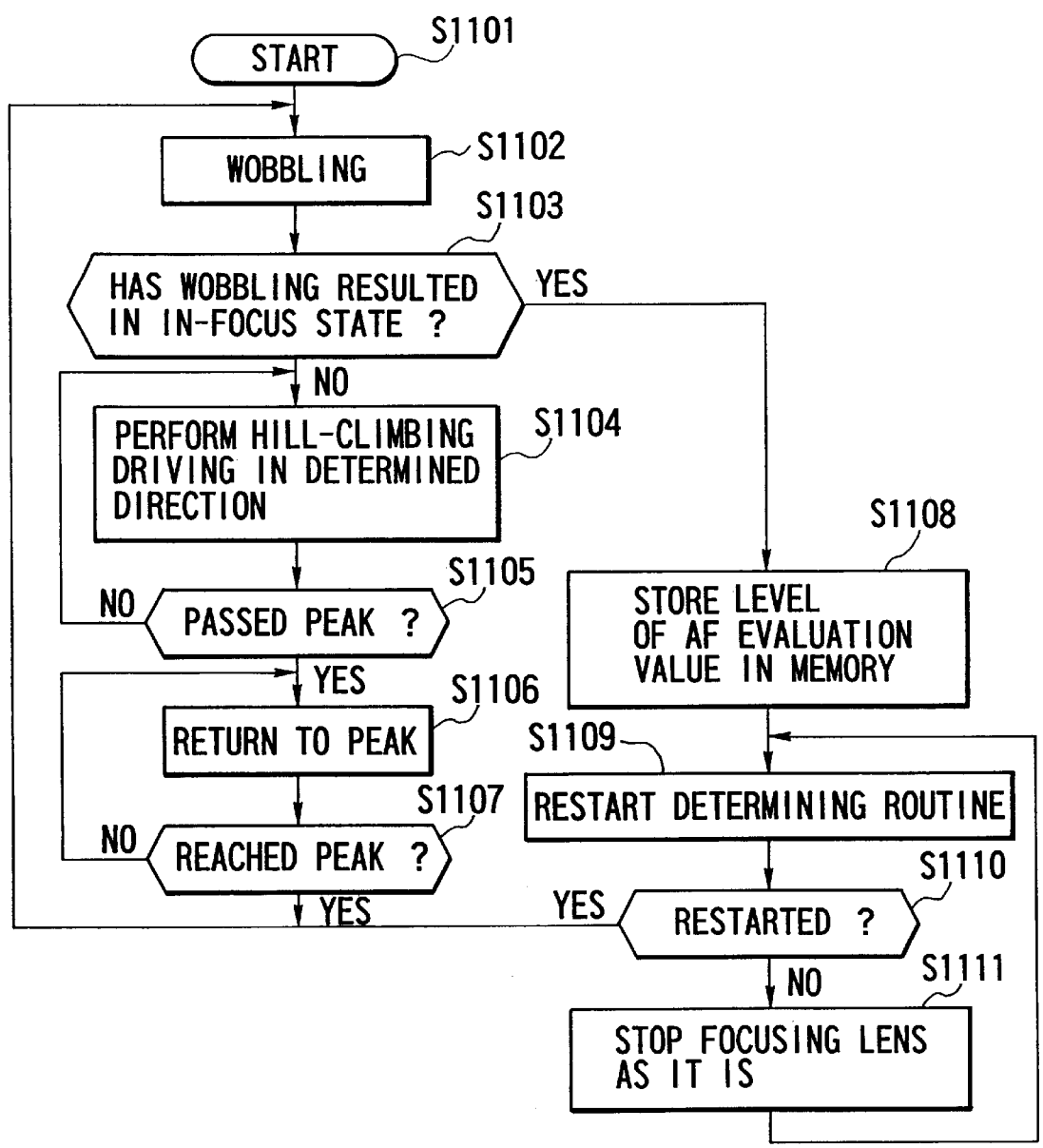
FIG. 11 is a flow chart showing how an AF action is performed in general.

FIG. 11 is a flow chart showing an AF control operation of the conventional image pickup apparatus of the kind mentioned in the foregoing. The control actions of the apparatus are executed by a microcomputer which is disposed within the body of the apparatus.

Referring to FIG. 11, the flow of the AF control begins at a step S1101. At a step S1102, a wobbling action is performed to obtain an AF evaluation value by causing a lens for the AF control to be minutely driven. At a step S1103, the AF evaluation value thus obtained is checked for the result of wobbling, that is, to find if the image picked up is in a blurred state. If so, a check is made to find whether the image is in a near-focus or far-focus state. If the image is found to be in focus, the AF lens is brought to a stop and the flow shifts to a restart monitoring process routine which begins with a step S1108.

If the image picked up is found to be not in focus at the step S1103, the flow proceeds to a step S1104. At the step S1104, the hill-climbing AF control action which is mentioned in the foregoing is carried out in the direction determined according to the result of the check made through the wobbling action. At a step S1105, a check is made to find if the hill-climbing AF control action has passed an in-focus point, i.e., the peak point of the AF evaluation value. If not, the flow returns to the step S1104 to carry on the hill-climbing AF control action. If so, the flow proceeds to a step S1106 to bring the AF lens back to the peak point. At a step S1107, a check is made to find if the AF lens has reached the peak point.

However, the position of the shooting object might be caused to vary, for example, by panning or the like during the process of returning the lens back to the peak point. In view of this possibility, after arrival of the AF lens at the peak point, the flow returns to the step S1102 to resume the wobbling action for the purpose of determining whether the present position is truly the peak point, i.e., an in-focus point.

When the image is determined to be in focus at the step S1103, the flow proceeds to the step S1108 for the restart monitoring process routine as mentioned above. At the step S1108, the level of the AF evaluation value obtained in the in-focus state is first stored in a memory. At the next step S1109, a restart determining routine is executed to find if the current level of the AF evaluation value shows a change from the level stored at the step S1108. Any change less than a predetermined percentage from the stored level is considered to be no change in the object and, in that case, a "restart" of the AF control action is determined to be not necessary.

At a step S1110, a check is made to find if the AF control action has been restarted, in accordance with the determination result obtained at the step S1109. If not, the flow proceeds to a step S1111 to have the AF lens stopped as it is and then returns to the step S1108 to resume the restart monitoring process. In the event of the restarting of the AF control action, the flow returns to the step S1102 to resume the wobbling action so as to determine the direction in which the AF lens is to be moved. The lens for AF is thus controlled to keep an in-focus state by repeating these steps.

The image pickup apparatus of the kind described above is, however, arranged to perform control over the AF action independently of control over the change-over of the aspect ratio of the image plane. Therefore, the prior art arrangement has presented the problem that the lens might fail to be appositely focused on an object located within the picked-up image plane when one aspect ratio is changed over to another aspect ratio.

Figure 12:
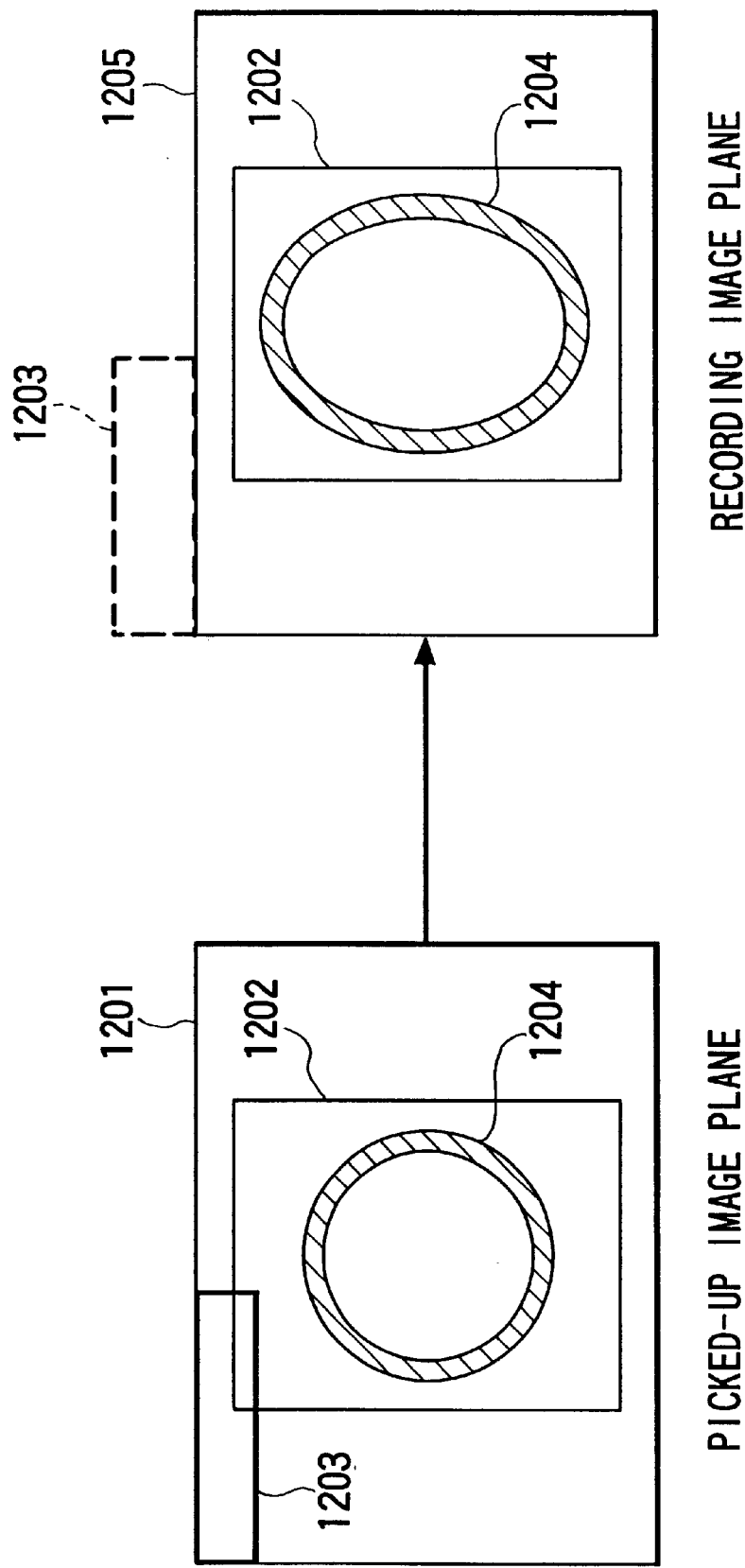
FIG. 12 is a diagram for explaining a problem arising when the aspect ratio of an image plane is varied.

FIG. 12 shows the change-over of the aspect ratio. In FIG. 12, reference numeral 1201 denotes a picked-up image plane obtained by a CCD or the like. Reference numeral 1202 denotes an AF distance measuring frame. Reference numeral 1203 denotes an object which is in focus. Reference numeral 1204 denotes an object which is out of focus. Reference numeral 1205 denotes a recording image plane which is obtained by changing the aspect ratio of the image plane 1201. As shown, when the aspect ratio is changed by magnifying the picked-up image plane 1201 vertically, the object 1203 which has been in focus until then disappears. Under this condition, if a difference of the AF evaluation value of the object 1204 which remains within the image plane but is out of focus from that of the object 1203 which has been in focus but now disappears happens to be within a predetermined level, i.e., within an allowable range of difference, the AF control operation does not restart, so that the AF lens cannot be brought to an in-focus position for the out-of-focus object 1204 located within the image plane.

The third embodiment of this invention is arranged to solve the above-stated problem and to be capable of preventing the failure to have the AF lens focused on the object located within the image plane at the time of change-over of the aspect ratio. Therefore, according to the arrangement of the third embodiment, an image pickup apparatus can be arranged to have always a sharp image plane.

The image pickup apparatus according to the third embodiment of this invention includes a lens movable for performing focus adjustment, an image sensor for converting, into a video signal, an object image formed through the lens, extraction means for extracting, from a predetermined area of the video signal, a signal corresponding to a degree of focusing, focus adjusting means for performing focus adjustment on the basis of the signal extracted, and varying means for varying an aspect ratio of a picked-up image plane formed by the video signal, wherein, when the aspect ratio of the picked-up image plane is varied by the varying means, the lens is restarted to perform focus adjustment again.

In the third embodiment, the varying means for varying the aspect ratio is arranged to magnify the picked-up image plane vertically, and the extraction means is arranged to vertically reduce the area from which to extract the video signal.

Further, the varying means for varying the aspect ratio is arranged to magnify the picked-up image plane vertically to 4/3 times, and the extraction means is arranged to vertically reduce the area from which to extract the video signal to 3/4 times.

Figure 9:
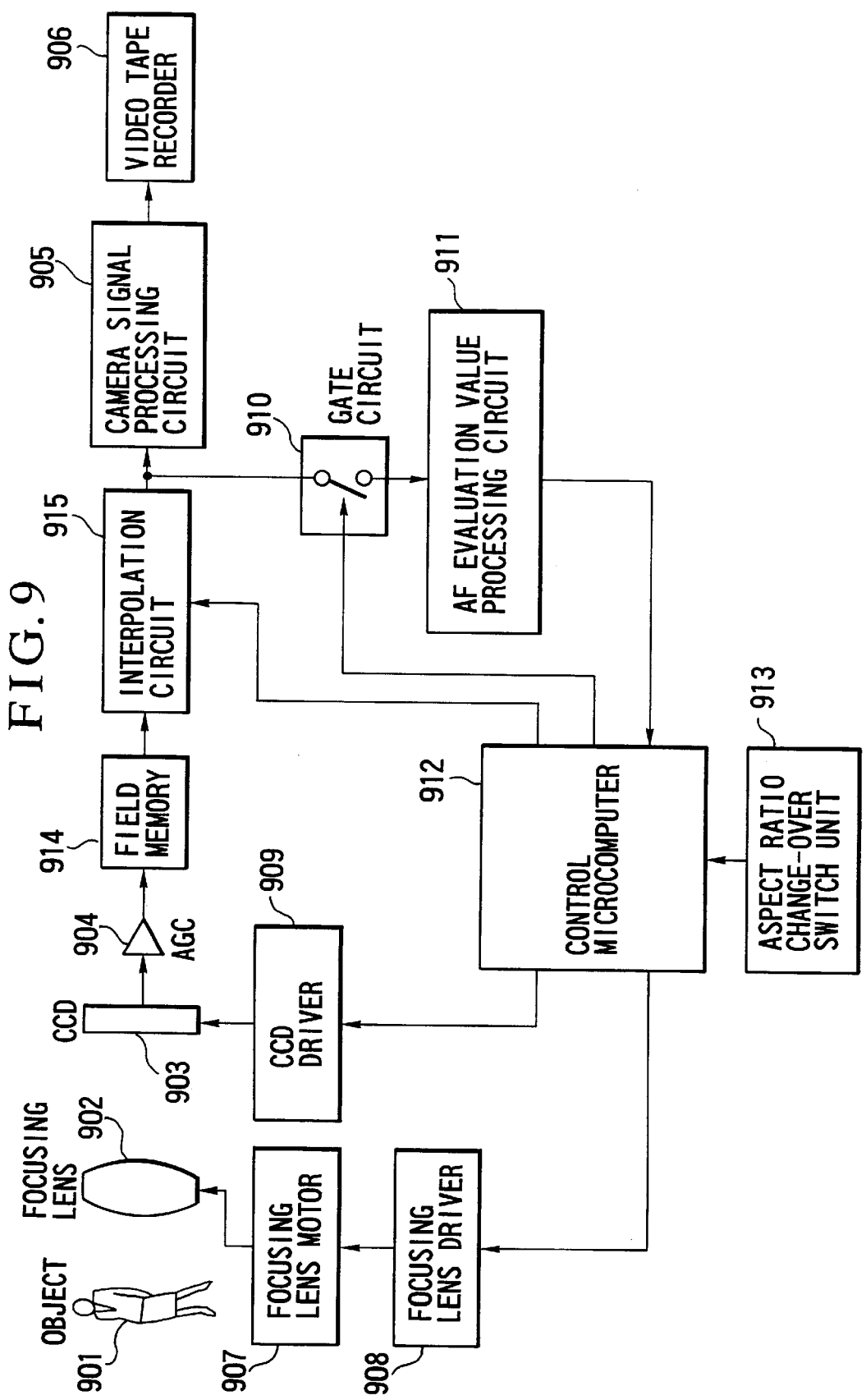
FIG. 9 is a block diagram showing the arrangement of an image pickup apparatus according to this invention as a third embodiment thereof.

FIG. 9 is a block diagram showing the basic arrangement of a camera-integrated type video tape recorder to which this invention is applied as the third embodiment.

In FIG. 9, reference numeral 901 denotes an object of shooting. A focusing and compensation lens group 902 (hereinafter referred to as a focusing lens) is provided for focus adjustment (focusing). An image sensor 903 which is a CCD is arranged to photoelectrically convert into a video signal an incident image light (object image) coming through the focusing lens 902. An automatic gain control (AGC) circuit 904 is arranged to electrically amplify the video signal coming from the CCD 903. A field memory 914 is arranged to take in and store the video signal for one picture processed by the AGC circuit 904. An interpolation circuit 915 is arranged to read the signal out from the field memory 914 at a magnifying rate according to a control signal coming from a control microcomputer 912 and to form a signal which is to be used for interpolating the signal read out. The interpolation circuit 915 thus provides a so-called electronic zooming function in conjunction with the field memory 914.

A camera signal processing circuit 905 is arranged to carry out various processes on the interpolated signal, such as a gamma correction process, a color separation process, a color-difference matrix process, etc., and to form a standard TV signal by adding to the processed video signal a synchronizing signal. A video tape recorder (VTR) 906 is arranged to record the video signal on a tape. A motor 907 (driving means) is arranged to drive the focusing lens 902 in parallel to an optical axis.

A focusing lens driver 908 is arranged to supply the lens driving motor 907 with driving energy according to a lens driving instruction given from the control microcomputer 912. A gate circuit 910 is arranged to sample only a predetermined extracting regional part of the signal outputted from the interpolation circuit 915. An AF evaluation value processing circuit 911 is arranged to form a sharpness signal for focus evaluation according to the degree of focusing indicated by the signal outputted from the gate circuit 910 and includes a band-pass filter as an extracting means.

The control microcomputer (focus adjusting means) 912 is arranged to perform focus adjustment by causing the focusing lens 902 to be driven on the basis of the signal outputted from the AF evaluation value processing circuit 911. A switch unit (varying means) 913 is provided for change-over of the aspect ratio.

The image pickup apparatus arranged as described above has a function of permitting change-over of the aspect ratio in response to a manual operation. The details of this function are the same as what has been described in the foregoing with reference to FIG. 4.

Figure 10:
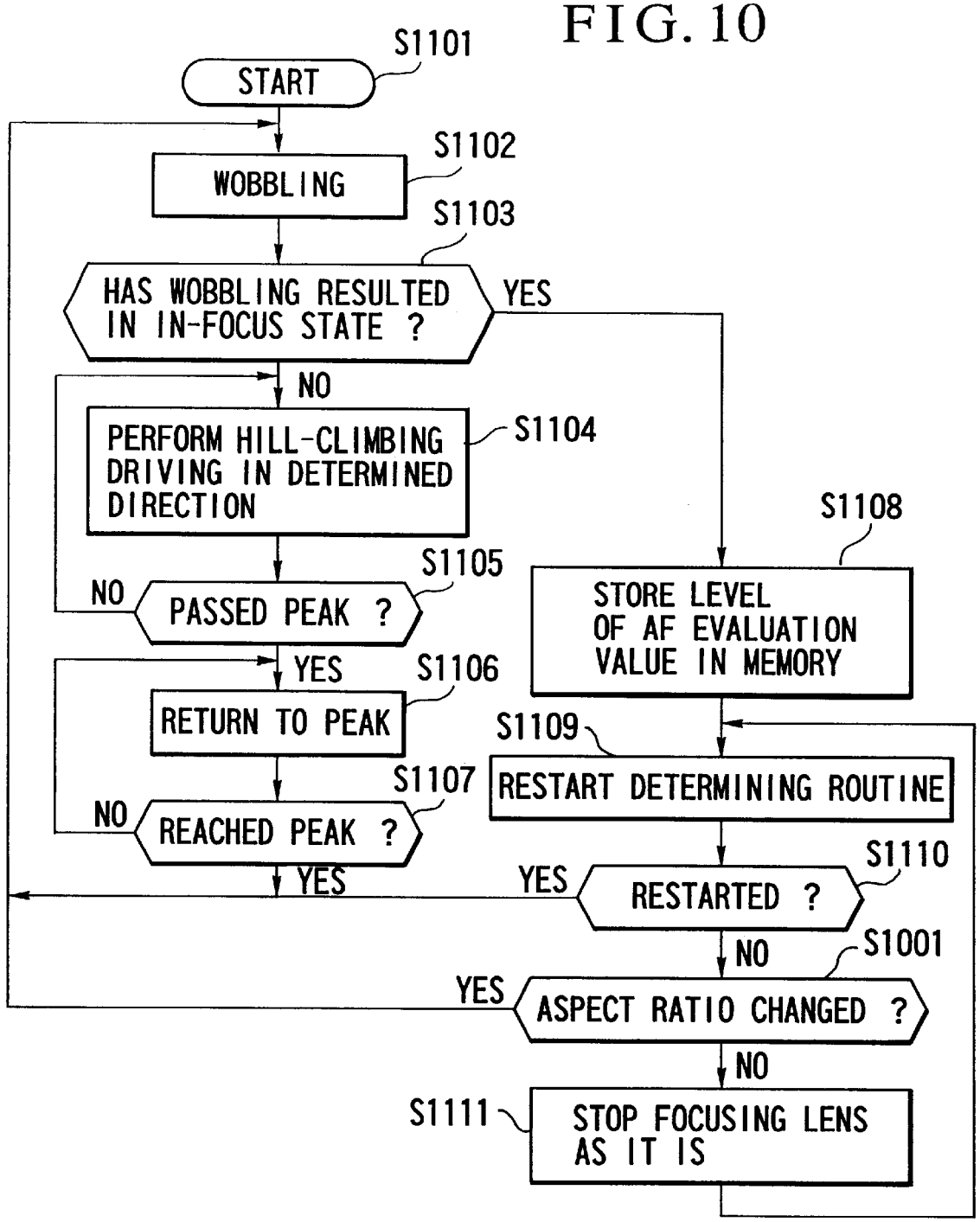
FIG. 10 is a flow chart showing an operation of the third embodiment of this invention.

FIG. 10 is a flow chart showing an AF control operation of the third embodiment. Control actions shown in this flow chart are to be executed within the control microcomputer 912. In the flow chart of FIG. 10, control actions to be executed in the same manner as in the case of FIG. 11 are indicated by the same step numbers.

Referring to FIG. 10, the flow of the AF control operation begins at a step S1111. At a step S1102, a wobbling action is performed to obtain an AF evaluation value by causing the focusing lens 902 to be minutely driven. At a step S1103, the AF evaluation value thus obtained is checked for the result of wobbling, that is, to find if the image picked up is in a blurred state. If so, a check is made to find whether the image is in a near-focus or far-focus state. If the image is found to be in focus, the focusing lens 902 is brought to a stop and the flow shifts to a restart monitoring process routine which begins with a step S1108.

If the image picked up is found to be out of focus at the step S1103, the flow proceeds to a step S1104. At the step S1104, the hill-climbing AF control action which is mentioned in the foregoing is carried out in the direction determined according to the result of the check made through the wobbling action. At a step S1105, a check is made to find if the hill-climbing AF control action has passed an in-focus point, i.e., the peak point of the AF evaluation value. If not, the flow returns to the step S1104 to carry on the hill-climbing AF control action. If so, the flow proceeds to a step S1106 to bring the focusing lens 902 back to the peak point. At a step S1107, a check is made to find if the focusing lens 902 has reached the peak point.

However, the position of the object of shooting might be caused to vary, for example, by panning or the like during process of returning the focusing lens 902 back to the peak point. In view of this possibility, after arrival of the focusing lens 902 at the peak point, the flow returns to the step S1102 to resume the wobbling action for the purpose of determining whether the present position is truly the peak point, i.e., an in-focus point.

When the image is determined to be in focus at the step S1103, the flow proceeds to the step S1108 for the restart monitoring process routine as mentioned above. At the step S1108, the level of the AF evaluation value obtained in the in-focus state is first stored in a memory. At the next step S1109, a restart determining routine is executed to find if the current level of the AF evaluation value shows a change from the level stored at the step S1108. For example, any change to an extent which is equal to or above a predetermined percentage from the stored level is considered to indicate a change in the object due to panning or the like and a "restart" of the AF control is determined to be necessary. If the change is found to be less than the predetermined percentage, it is considered to indicate no change in the object and, in that case, the "restart" of the AF control is determined to be not necessary.

At a step S1110, a check is made to find if the AF control has been restarted. If not, the flow proceeds to a step S1001. At the step S1001, a check is made to find if the aspect ratio has been changed. If not, the flow proceeds to a step S1111 to have the focusing lens 902 stopped as it is and then returns to the step S1108 to resume the restart monitoring process. If the AF control is found at the step S1110 to have been restarted or if the aspect ratio is found at the step S1001 to have been changed, the flow returns to the step S1102 to resume the wobbling action to determine the direction in which the focusing lens 902 is to be moved.

As mentioned above, even where the restart of the AF control is determined to be not necessary at the step S1110, if the aspect ratio is changed, the provision of the step S1001 forcibly causes the restart of the AF control. Therefore, the problem of leaving the object image in a blurred state after a change in the aspect ratio can be effectively solved. The focusing lens 902 is thus caused to act to maintain an in-focus state by repeating the steps described above.

With the AF control restarted after a change in aspect ratio by carrying out the AF control according to the algorithm shown in FIG. 10, the focusing lens 902 is prevented from remaining in a state of being focused on an object which is expanded outside of the image plane and remaining not focused on an object which is located within the image plane, as mentioned above. The AF control thus always gives sharp images.

As described above, according to the third embodiment, the AF control is performed in association with the change of the aspect ratio to cause the AF control to be restarted when the aspect ratio is changed. Therefore, at the time of change-over of the aspect ratio, the focusing lens 902 can be effectively prevented from remaining focused on an object which is expanded outside of the image plane and from remaining out of focus for an object which is located within the image plane. The third embodiment thus always gives sharp object images without any blur.

A fourth embodiment of this invention is next described. The fourth embodiment is aimed at an improvement on an automatic focus adjusting device of such a type that focus adjustment is performed by detecting the sharpness in the picked-up image signal as described above.

With a reduction in size and weight of cameras advanced, the hill-climbing AF control has come to be most popularly used for video cameras of these days, because it permits an AF (automatic focusing) control with a simple system. In the meantime, there are cameras of the kind having an electronic shutter which is arranged to permit the exposure time of an image sensor to be electrically variable. The arrangement and operation of the camera of such a kind are described below with reference to FIG. 13.

Figure 13:
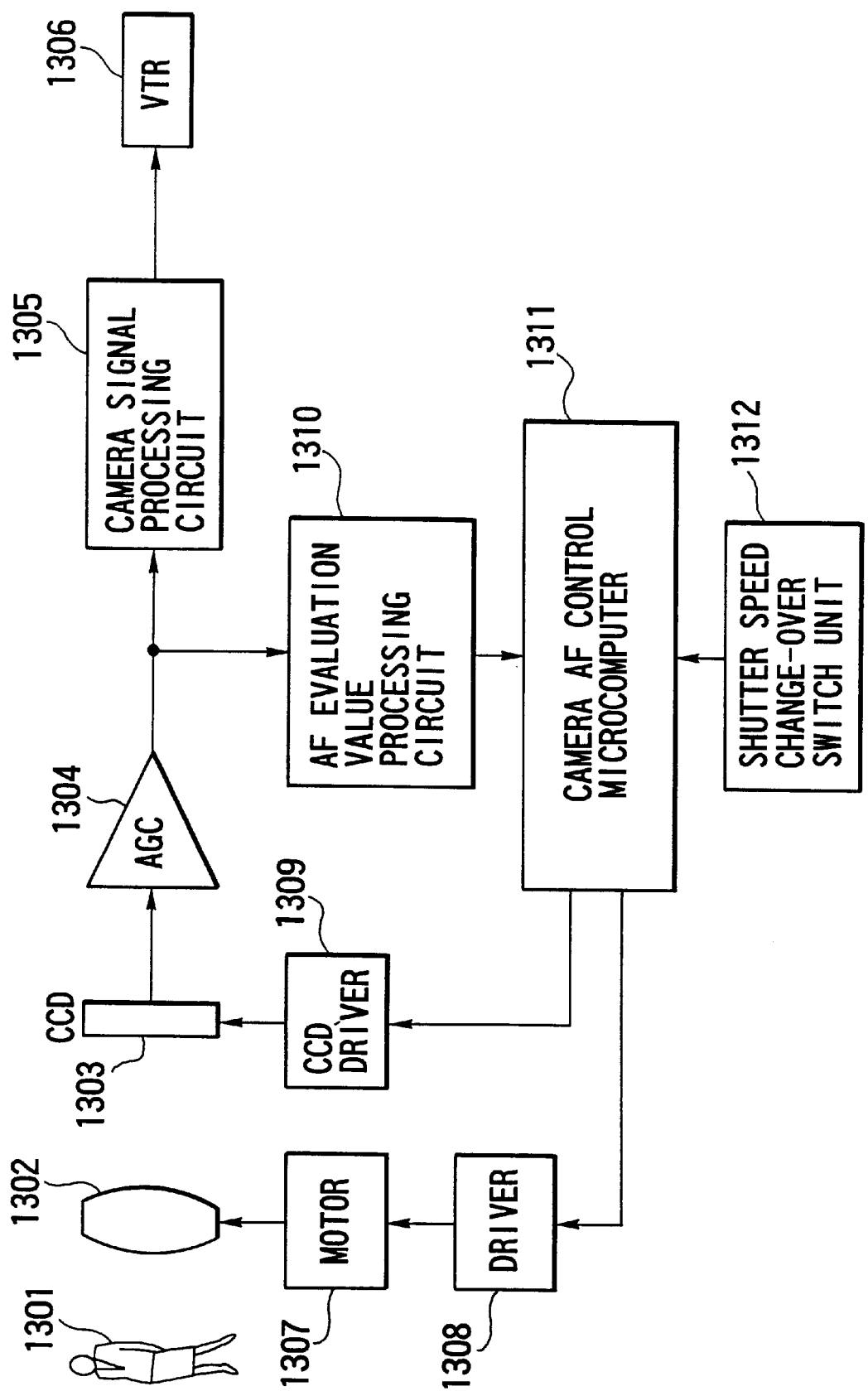
FIG. 13 is a block diagram showing the arrangement of an image pickup apparatus according to this invention as a fourth embodiment thereof.

Referring to FIG. 13, which is a block diagram, the illustration includes an object of shooting 1301 and a focusing lens 1302. An image sensor 1303 which is a CCD is arranged to photoelectrically convert an incident light into an electrical signal. An automatic gain control (AGC) circuit 1304 is arranged to electrically amplify the signal coming from the CCD 1303. A camera signal processing circuit 1305 is arranged to process the output of the AGC circuit 1304 to carry out a gamma correction process, a color separation process, a color-difference matrix process, etc., and then to make the processed signal into the a standard TV signal by adding a synchronizing signal thereto. A video tape recorder (VTR) 1306 is arranged to record the video signal on a tape. A motor 1307 is provided for driving the focusing lens 1302. A motor driver 1308 is arranged to supply the motor 1307 with driving energy according to a driving instruction given from a control microcomputer 1311.

A CCD driver 1309 is arranged to read the photoelectrically converted signal out from the CCD 1303 by controlling the CCD 1303 and to control a so-called electronic shutter function by controlling the charge accumulating time of the CCD 1303. An AF evaluation value processing circuit 1310 is arranged to form an AF evaluation signal (sharpness signal) to be used for focus evaluation from a signal outputted from the AGC circuit 1304. The AF evaluation value processing circuit 1310 is provided with a gate circuit and a filter for forming the AF evaluation signal by sampling only a predetermined part of the video signal. The control microcomputer 1311 is arranged to control focus adjustment on the basis of a signal outputted from the AF evaluation value processing circuit 1310 and also to control the exposure time of the CCD 1303. There is further provided a shutter speed change-over switch unit 1312.

The image pickup apparatus arranged as described above is provided with the shutter speed change-over switch unit 1312 for the purpose of enabling the operator to make a picture as desired by manually varying the shutter speed. The control microcomputer 1311 is arranged to vary the electric charge accumulating time of the CCD 1303 by controlling the CCD driver 1309 in response to an input from the shutter speed change-over switch unit 1312. This arrangement gives an electronic shutter.

The flow of the AF control of the arrangement described above is identical with what is shown in the flow chart of FIG. 11 and is, therefore, omitted from the following description.

However, since the AF control and the shutter control are arranged to be performed independently of each other, the above arrangement brings about the following problem. When the shutter speed varies during process of the AF control, the AF evaluation signal also varies according to the change in shutter speed. The focusing lens then might be either erroneously moved in the direction of blurring or brought to a stop in a blurring position by a misjudgment for an in-focus position.

The fourth embodiment is aimed to solve this problem to give an image pickup apparatus arranged to be capable of carrying out the AF control without blurring the image even when the shutter speed is changed during process of the AF control.

To attain this aim, according to the fourth embodiment, an image pickup apparatus comprises lens means movable for focus adjustment, driving means for driving the lens means in an optical axis direction, image pickup means for converting an object image formed through the lens means into a video signal, extraction means for extracting from the video signal a sharpness signal corresponding to a degree of focusing of the lens means, varying means for varying an exposure time of the image pickup means, and control means for performing the focus adjustment by controlling the driving means on the basis of the sharpness signal extracted by the extraction means and for controlling the driving means to restart the lens means when the exposure time is varied by the varying means during process of the focus adjustment.

According to the arrangement of the fourth embodiment, the lens means is forcibly restarted to do wobbling again when the exposure time is changed during process of the focus adjustment, so that an in-focus point can be attained to have no blurred state.

Figure 14:
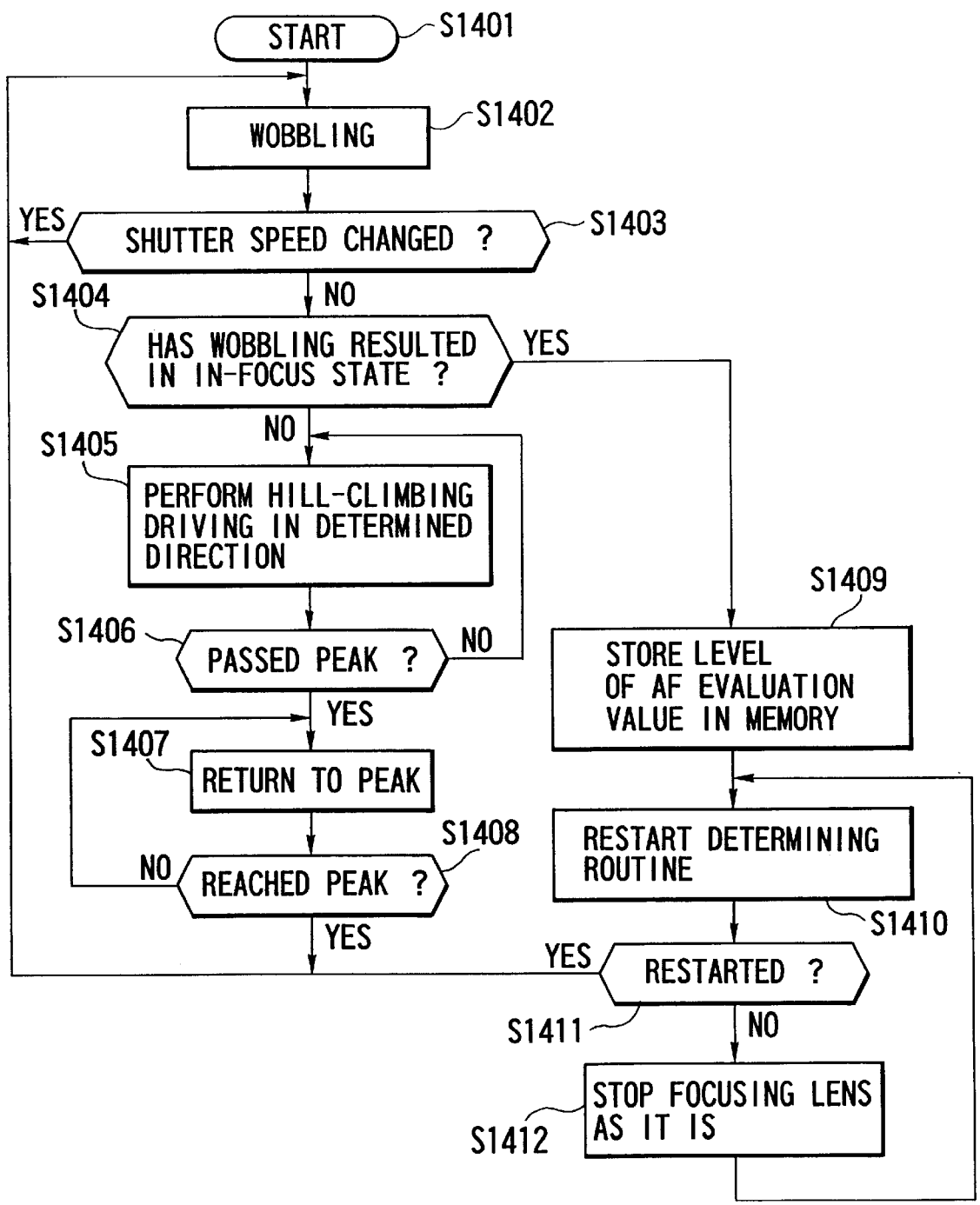
FIG. 14 is a flow chart showing an operation of the fourth embodiment of this invention.

FIG. 14 is a flow chart showing the AF control operation of the fourth embodiment. The flow chart of FIG. 14 has a step S1403 added to the flow chart of FIG. 10 between the steps S1102 and S1103.

Referring to FIG. 14, the flow begins at a step S1401. At a step S1402, a wobbling action is performed to obtain an AF evaluation value by causing the focusing lens 1302 to be minutely driven. A check is thus made for the current focusing state to find whether the image is in focus or out of focus and, in the latter case, to find whether the image is in a near-focus or far-focus state. At the step S1403, a check is made to find if the shutter speed has been changed by the shutter speed change-over switch unit 1312. If the shutter speed has been changed, the level of the AF evaluation value might vary to mislead the AF control in the wrong direction or to erroneously determine an in-focus state. Therefore, it is necessary to confirm again the state of focusing by restarting the focusing lens 1302. Accordingly, if the result of the check at the step S1403 is YES, the flow returns to the step S1402 to do the wobbling action again. If the result of the check at the step S1403 is NO, the flow proceeds to the step S1404 to check the result of the wobbling action to find if the image is now in focus. If so, the focusing lens 1302 is brought to a stop and the flow shifts to a restart monitoring process routine which begins with a step S1409.

If the image is found to be out of focus at the step S1404, the flow proceeds to a step S1405. At the step S1405, the hill-climbing AF control mentioned in the foregoing is carried out in the direction determined by the result of the check made through the wobbling action. At a step S1406, a check is made to find if the hill-climbing AF control has passed an in-focus point, i.e., the peak point of the AF evaluation value. If not, the flow returns to the step S1405 to carry on the hill-climbing AF control. If so, the flow proceeds to a step S1407 to bring the focusing lens 1302 back to the peak point. At a step S1408, a check is made to find if the focusing lens 1302 has reached the peak point. However, the position of the object of shooting might be caused to vary, for example, by panning or the like during the process of returning the focusing lens 1302 back to the after arrival of the focusing lens 1302 at the peak point, the flow returns to the step S1402 to resume the wobbling action.

If the image is determined to be in focus at the step S1404, on the other hand, the flow proceeds to the step S1409 for the restart monitoring process routine as mentioned above. At the step S1409, the level of the AF evaluation value obtained in the in-focus state is first stored in a memory. At the next step S1410, a restart determining routine is executed to find if the current level of the AF evaluation value shows a change from the level stored at the step S1409. For example, any change to an extent equal to or above a predetermined percentage from the stored level is considered to indicate a change in the object due to panning or the like and a "restart" of the AF control is determined to be necessary. If the change is found to be less than the predetermined percentage, it is considered to indicate no change in the object and, in that case, the "restart" of the AF control is determined to be not necessary. At a step S1411, a check is made to find if the AF control has been restarted. If not, the flow proceeds to a step S1412 to keep the focusing lens 1302 stopped as it is and then returns to the step S1410 to resume the restart monitoring process. If the AF control is found at the step S1411 to have been restarted, the flow returns to the step S1402 to resume the wobbling action to determine the direction in which the focusing lens 1302 is to be moved. By repeating the above steps, the focusing lens 1302 is thus caused to act to maintain an in-focus state.

With the wobbling action caused to be performed again, when the AF evaluation value is caused to change by a change in the shutter speed, by carrying out the AF control according to the algorithm shown in FIG. 14, the fourth embodiment prevents the focusing lens 1302 from moving in the direction of blurring or from remaining in a blurring position, so that the AF control can be carried out to give a sharp image.

As described above, the fourth embodiment is arranged to perform the AF control in association with the shutter speed control to restart the AF control according to changes taking place in shutter speed. Therefore, even when the shutter speed changes during process of the AF control, an AF action such as wobbling is performed again to effectively prevent the focusing lens from remaining in a blurring position due to misjudgment for an in-focus state. The AF control thus can be always carried out to give a sharp object image without blurring.

What is claimed is:

1. An image pickup apparatus comprising:

focus adjustment means;

driving means for driving said focus adjustment means;

image pickup means for converting an object image formed through said focus adjustment means into a video signal;

extraction means for extracting from a predetermined area of the video signal a sharpness signal corresponding to a degree of focusing of said focus adjustment means;

control means for performing focus adjustment by controlling said driving means on the basis of the sharpness signal extracted by said extraction means;

aspect ratio varying means for varying an aspect ratio of a picked-up image;

area varying means for varying the predetermined area when the aspect ratio of the picked-up image is varied by said aspect ratio varying means, said area varying means varying a dimension of said predetermined area reverse to the varying of a magnification of said picked-up image as a result of varying the aspect ratio of said picked-up image by said aspect ratio varying means.

2. An apparatus according to claim 1, wherein said area varying means varies a size of the predetermined area when the aspect ratio is varied.

3. An apparatus according to claim 2, wherein said aspect ratio varying means varies the aspect ratio of the picked-up image plane between 4:3 and 16:9.

4. An apparatus according to claim 1 or 3, wherein said area varying means keeps the predetermined area always having a fixed size within the picked-up image plane.

5. An apparatus according to claim 1 or 3, wherein said aspect ratio varying means electrically magnifies the picked-up image plane vertically, and said area varying means reduces the predetermined area vertically.

6. An apparatus according to claim 1 or 3, wherein said aspect ratio varying means electrically magnifies the picked-up image plane vertically to 4/3 times, and said area varying means reduces the predetermined area vertically to 3/4 times.

7. An image pickup apparatus comprising:

image pickup means for converting an object image into a video signal;

extraction means for extracting from a predetermined area of the video signal a signal corresponding to a degree of focusing of said object image;

control means for performing focus adjustment on the basis of the signal extracted by said extraction means;

aspect ratio varying means for varying an aspect ratio of a picked-up image; and area varying means for varying the predetermined area when the aspect ratio of the picked-up image is varied by said aspect ratio varying means, said area varying means varying a dimension of said predetermined area reverse to the varying of a magnification of said picked-up image as a result of varying the aspect ratio of said picked-up image by said aspect ratio varying means.

8. An image pickup apparatus comprising:

(A) an aspect ratio varying device which varies an aspect ratio of a picked-up image, (B) a focus adjustment device which performs focus adjustment for an object within a predetermined area of focus adjustment, wherein said focus adjustment device varies the predetermined area of focus adjustment according to the variation of the aspect ratio by said aspect ratio varying device, said focus adjustment device varying a dimension of said predetermined area reverse to the varying of a magnification of said picked-up image as a result of varying the aspect ratio of said picked-up image by said aspect ratio varying device.

9. An apparatus according to claim 8, wherein said focus adjustment device varies a size of said predetermined area of focus adjustment according to the variation of the aspect ratio by said aspect ratio varying device.

10. An apparatus according to claim 8, wherein said aspect ratio varying device varies a vertical-horizontal ratio of said pick-up image plane to 4:3 and 16:9.

11. An apparatus according to claim 8, wherein said focus adjustment device performs the variation of the predetermined area of focus adjustment in reverse to the variation of the aspect ratio by said aspect ratio varying device.

12. An apparatus according to claim 8, wherein said focus adjustment device detects a focus adjustment signal from the focus adjustment area.

13. An apparatus according to claim 12, wherein said focus adjustment device detects a sharpness signal as the focus adjustment signal from said focus adjustment area.

14. An apparatus according to claim 8, further comprising, an image pickup device which forms an image signal for photography, wherein said focus adjustment device obtains the focus adjustment signal by the image signal from said image pickup device.

15. An apparatus according to claim 8, wherein said focus adjustment device includes a motor which drives an image pickup optical system for focus adjustment.

16. An apparatus according to claim 8, wherein said focus adjustment device includes an image pickup optical system for focus adjustment and a motor which drives said image pickup optical system.

* * * * *

UNITED STATES PATENT AND TRADEMARK OFFICE
CERTIFICATE OF CORRECTION

PATENT NO. : 6,333,761 B2
DATED : December 25, 2001
INVENTOR(S) : Hitoshi Yasuda It is certified that error appears in the above-identified patent and that said Letters Patent is hereby corrected as shown below:

<u>Column 3,</u>
Line 55, after "AF" delete "w".

<u>Column 9,</u>
Line 13, delete "S1111" and insert -- S1101 --.

Signed and Sealed this

Nineteenth Day of November, 2002

*Attest:*

*Attesting Officer*

JAMES E. ROGAN
*Director of the United States Patent and Trademark Office*